United States Patent
Clune et al.

(10) Patent No.: US 7,966,161 B1
(45) Date of Patent: Jun. 21, 2011

(54) EVENT PROCESSING OF COMBINATION ENTITIES IN MODELING ENVIRONMENTS

(75) Inventors: Michael I. Clune, Natick, MA (US); Anuja Dilip Apte, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 884 days.

(21) Appl. No.: 11/646,049

(22) Filed: Dec. 27, 2006

Related U.S. Application Data

(63) Continuation-in-part of application No. 11/010,148, filed on Dec. 10, 2004, now Pat. No. 7,369,977.

(60) Provisional application No. 60/611,574, filed on Sep. 20, 2004.

(51) Int. Cl.
*G06G 7/48* (2006.01)

(52) U.S. Cl. .......................................................... 703/6

(58) Field of Classification Search ................... 703/6, 17
See application file for complete search history.

(56) References Cited

U.S. PATENT DOCUMENTS

| | | | |
|---|---|---|---|
| 5,440,719 A * | 8/1995 | Hanes et al. .................... 703/21 |
| 6,377,543 B1 * | 4/2002 | Grover et al. ................. 370/227 |
| 6,856,950 B1 * | 2/2005 | Abts et al. ........................ 703/13 |
| 7,369,977 B1 * | 5/2008 | Clune et al. ........................ 703/6 |
| 7,640,154 B1 * | 12/2009 | Clune et al. ..................... 703/22 |
| 2004/0024578 A1 * | 2/2004 | Szymanski et al. ............. 703/17 |
| 2004/0073404 A1 * | 4/2004 | Brooks et al. ................. 702/183 |
| 2004/0230404 A1 * | 11/2004 | Messmer et al. .................. 703/1 |
| 2005/0111477 A1 * | 5/2005 | Ghanma et al. ............... 370/445 |
| 2005/0177353 A1 * | 8/2005 | Slater ................................ 703/6 |

* cited by examiner

*Primary Examiner* — Jason Proctor
*Assistant Examiner* — Aniss Chad
(74) *Attorney, Agent, or Firm* — Nelson Mullins Riley & Scarborough LLP

(57) ABSTRACT

A mechanism for processing events in a modeling environment is discussed. Embodiments of the invention identify multiple entities in a model, at least one of which includes an associated event. A combination entity is created from the identified entities with the combination entity including at least one event derived from the associated events. The combination entity is processed based upon the occurrence of at least one derived event.

72 Claims, 9 Drawing Sheets

EVENT PROCESSING OF COMBINATION ENTITIES IN MODELING ENVIRONMENTS

RELATED APPLICATION

The present application is a continuation-in-part of a United States Patent Application entitled "System and Method for Modeling Timeouts in Discrete Event Execution", application Ser. No. 11/010,148 filed on Dec. 10, 2004, the contents of which are incorporated herein by reference in their entirety.

BACKGROUND

Historically, time-based block diagram modeling environments have been used to study, design, debug, and refine dynamic systems representative of many real-world systems. A dynamic system (either natural or man-made) is a system whose response at any given time is a function of its input stimuli, its current state, and the current time. In addition, discrete event system (DES) modeling environments have been developed to allow the design and simulation of event-based systems. In a DES modeling environment, a system's state transitions depend on discrete incidents called events. DES models may execute based upon the occurrence of events independent of continuous model time unlike traditional time-based modeling environments where the execution of the system is time-based.

A primary type of data component within a DES model is referred to as an "entity." Entities are abstract representations of elements of interest within the DES model and may vary depending upon what is being modeled by the DES system. Entities are the items that pass from block to block in the DES model. For example, when modeling a digital network, an entity may represent a data packet. In another example, when modeling a manufacturing plant, entities may take the form of individual items on the assembly line. Many DES models have at least one entity within the model.

Many entities also have events that are associated with or related to the entity. For example, many entities include timeout events that cause the entity to be processed in a particular manner upon expiration or cancellation of a timeout value (e.g., after a specified period of time has elapsed). Timeout functionality is associated with an entity being passed between blocks and can be scheduled or terminated upon occurrence of a start condition or an end condition, respectively. A start condition or an end condition can be, for example, an entity passing through a port, an entity entering a block or an entity exiting a block. The timeout functionality is configured to expire after a selected time period. After a timeout expires, the entity with the expired timeout may be sent for timeout processing.

SUMMARY

In one embodiment, a method for processing events in a modeling environment includes the step of identifying multiple entities in a model. At least one of the entities includes an associated event. The method also includes the step of creating a combination entity formed from the identified entities. The combination entity includes at least one event derived from one or more of the associated events for the entities used to form the combination entity. The method also processes the combination entity based upon the occurrence of at least one derived event.

In an embodiment, a system for processing events in a modeling environment includes multiple entities in a model. At least one of the entities includes an associated event. The system also includes a combination entity formed from the entities that includes at least one event derived from one or more associated events included in the entities that are used to form the combination entity. The combination entity is processed based upon the occurrence of at least one derived event.

In another embodiment, a method for processing a combination entity holding at least one timeout value in a discrete event system (DES) modeling environment includes the step of receiving multiple entities as input to an entity combiner component in a Discrete Event System (DES) model. At least one of the entities includes an associated timeout value. The method also outputs from the entity combiner component a combination entity formed from the entities received as input. The combination entity includes at least one timeout value derived from one or more of the associated timeout values from the entities used to form the combination entity. The method further processes the combination entity based upon the expiration of at least one derived timeout value.

In another embodiment, a system for processing a combination entity holding at least one timeout value in a discrete event system (DES) modeling environment includes an entity combiner component in a DES model. The entity combiner component receives multiple entities transmitted as input to the entity combiner component. At least one of the entities includes an associated timeout value. The system includes a combination entity formed from the multiple entities received as input. The combination entity includes at least one timeout value derived from one or more of the associated timeout values included in the entities that are used to form the combination entity. The system also includes a target processing component. The target processing component processes the combination entity based upon the expiration of at least one derived timeout value.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

Figure 1:
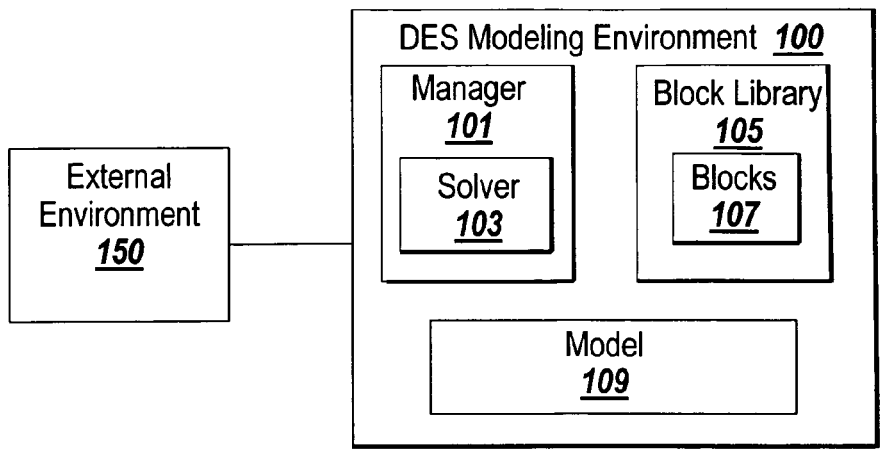
FIG. 1 depicts an exemplary DES modeling environment.

Techniques have been developed that allow multiple entities in a model to be combined into a single combination entity. Combination entities can include combinations of events that are received by the combination entity from one or more originating entities. The model in which the combination entity appears may be implemented so as to send the combination entity for processing upon the detection of an event occurring. However, the combination of multiple entities, each of which may possess associated disparate events, into a combination entity presents a problem in so far as representing the events in the combination entity is concerned. The events included in the combination entity may be inconsistent with each other and may cause the model to execute in unexpected ways.

Exemplary embodiments of the present invention provide a mechanism for processing events, such as timeout events, that are included within combination entities in a model. Exemplary embodiments use a number of different types of events with combination entities. For example, a combination entity may be sent for timeout processing based upon the occurrence of the expiration of a first, last, or a subset of timeout events included in the combination entity. The combination entity may also be sent for timeout processing based upon the expiration of a mean, an average, a median, a weighted average or other measurement related to one or more timeout events included in the combination entity.

As noted, entity aggregation provides the ability for models operating in modeling environments to pass a single combination entity rather than multiple entities. However, in order to effectively implement a modeling system that uses combination entities, provision should be made for handling the disparate event information from the original entities that have been combined into the combination entity. Events may include various actions, such as timeouts, service time, inspecting an attribute, viewing of an attribute, extraction operations (e.g., moving an entity from one location to another location within a model, across models, etc.), firing operations (e.g., firing embedded logic within an entity, state flow chart firing, block firing, etc.), time-based operations in a time-based model (e.g., a Simulink® model or other type of time-based model), enabling operations, disabling operations, etc. The embodiments of the present invention provide a framework for handling events included within the combination entity. Some, all, or none of the event information included in the combination entity may be used during the processing of the combination entity depending upon the implementation chosen.

Graphical analysis, simulation, and execution techniques are used in modeling, design, analysis, and synthesis of engineered systems. These techniques provide a visual representation of a model, such as a block diagram. The visual representation provides a convenient interpretation of model components and/or structure. For example, the components of a block diagram can capture a mathematical representation of the actual system being modeled and this information can be presented to a user via a visual representation. The visual representation also provides a quick intuitive notion of system behavior.

Graphical modeling systems may be time-based, event-based, or include elements of both. For example, a time-based graphical modeling system may use time-based block diagrams to study, design, debug, and/or refine dynamic systems representative of many real-world systems. A dynamic system (either natural or man-made) is a system whose response at any given time is a function of its input stimuli, its current state, and the current time. Such systems range from simple to highly complex systems. Time-based block diagram modeling has become particularly attractive over the last few years with the advent of software packages to process large amounts of data and perform a high number of computational iterations.

Additionally, a system model may be event-based. Event-based systems change their state based on discrete events. These events may be untimed or have a temporal characteristic. An example of an untimed event is the start of a task when two required resources are both available. This could be in a model of a manufacturing plant where the painting of an automobile requires the automobile to be present at the paint station and the paint station to be set up for the desired color. Untimed events often determine the behavior of a state machine such as a represented by a state transition diagram, which may, in case of a statechart, be hierarchical, allow event broadcast, and support parallelism. An example of a timed event is finishing a service. For example, the painting of an automobile may take a predetermined amount of time. After this time, an event may be generated in a model of the painting task to indicate that the coloring has finished. State machines that have their behavior determined by timed events are, for example, timed automata. Because the state is explicitly shown, these state machine representations can be referred to as state-based systems.

Rather than taking a discrete state centric approach, entity flow network diagrams are event-based systems that capture the state implicitly. The events in entity flow network diagrams often are timed, but can be untimed as well. The overall state of the system is a combination of the state of each of its elements and the events scheduled to occur in due time, and is often not explicitly shown. These systems are often simply referred to as discrete event systems, because of their event-centric perspective.

Classes of graphical models include time-based block diagram execution applications such as Simulink® software from the MathWorks, Inc. Natick Mass. state-based flow diagram execution applications such as Stateflow® software from the MathWorks, Inc. Natick Mass., other models such as data flow diagrams, UML, VHDL, including analog extension to VHDL in the form of VHDL-AMS, and the like. The various classes of graphical models that enable a user to describe a system and related computations can be performed on application specific computational hardware, such as a computer, microcontroller, Field Programmable Gate Array (FPGA), Application Specific Integrated Circuit (ASIC), Application Specific Integrated Processor (ASIP), or custom hardware.

Block diagrams are an example of an interactive graphical modeling tool that enables users to quickly create, model, simulate, and test representations of dynamic systems. Block diagrams may use time-based models and are suitable for simulating time-varying systems (e.g., such as periodic systems or aperiodic systems). A block diagram model makes use of blocks and arrows to connect the blocks, when forming the model. Each arrow connecting one enabled block to another may represent a signal that may have a value at a point in time. The arrow identifies the blocks that interact with the signal as being related to either input or output as the signal varies with time.

A discrete event system (DES) modeling environment is one wherein the system state changes based on discrete events. In some DES modeling environments, transitions may be modeled by an entity flow network and can depend on possibly periodic or aperiodic discrete incidents called events. Exemplary entity flow networks include a queue/server model, a Petri net, a sequential function chart, etc. FIG. 1 depicts a DES modeling environment 100. The DES modeling environment 100 includes an event modeling manager 101. The manager 101 coordinates the operation of the DES modeling environment 100 to process model executions. The manager 101 includes a solver 103, which processes a DES model 109 that may be configured in the DES modeling environment 100. The manager 101 supports the creation of DES blocks 107 that represent various aspects of the DES model 109. The blocks 107 can represent different portions of the model 109. Example blocks include an entity generator, a queue, a server, and a terminator, entity combiner, timeout related blocks, in addition to other blocks having specific tasks and implementations.

An entity generator block produces one or more entities at fixed time intervals. A queue block may hold an entity for an indeterminate time interval. For example, a queue block may operate according to an ordering policy (e.g., a first in first out (FIFO), last in first out (LIFO), priority based ordering, random ordering, etc.) and may release events according to the policy. The queue block accepts entities and is capable of forwarding them to other blocks. A server block may store an entity for a period of time before the entity is output through an output port that is identified as unblocked. A terminator block acts as a sink, an absorber of entities. The terminator block can be defined to accept all entities delivered to it, or in the alternative can block all or some entities delivered to it according to selected conditions. An entity combiner block merges entities by accepting entities from any input port and outputs them as one combined entity through a single entity output port. A block library 105 holding blocks 107 can be provided that is customized for operation within the DES modeling environment 100.

In operation, the DES modeling environment 100 makes use of the various blocks 107 to organize and manipulate entities through the DES model 109. For example, the manager 101 may manage the configuration of multiple blocks 107 to form the DES model 109. Blocks 107 can be placed in the model 109 for entity generation, subsequent entity manipulation, and eventually entity termination. The basic operation of the DES model 109 involves passing the entities through the blocks 107 according to instructions governed by the manager 101 and solver 103.

In one implementation, the manager 101 can be represented by an event calendar, wherein the event calendar serves to drive the DES model forward by executing the next scheduled event in the event calendar. The event calendar may be a doubly-linked list, a heap, an array, a calendar queue, another type of data structure, or a combination of data structures. The solver 103 is a mechanism which allows for the execution of events in the DES event calendar in light of operations which can occur in the external environment. The solver 103 may be in communication with an external environment 150 and can notify the external environment 150 of events occurring within the DES modeling environment 100.

Nominally, an entity is associated with a set of attributes. Implementations of entities may include multiple attributes or may contain as few as zero attributes. In one implementation, an attribute can be a field wherein the attribute is named and the attribute type is defined. For example, a field can define the entity type as a Boolean, a real number, an integer number, an enumerated type, a string, a vector, a matrix, a frame, and the like, such that the entity is of arbitrary data type.

An arbitrary data type may represent an arbitrarily complex structure containing data that may include hierarchical composition. The contained data can be as general as a single bit of information and any sequence of such bits representing characters, numeric values, or any other syntactic and semantic datum. In one implementation, the entity may contain attributes that are a (name, value) pair.

Furthermore, an entity may contain a hierarchy of attributes and can contain sub-entities. A sub-entity is an entity that is contained within another entity, thus making the other entity a combination entity. Sub-entities can be utilized in numerous operations such as recursive nesting or combining hierarchies.

Figure 2:
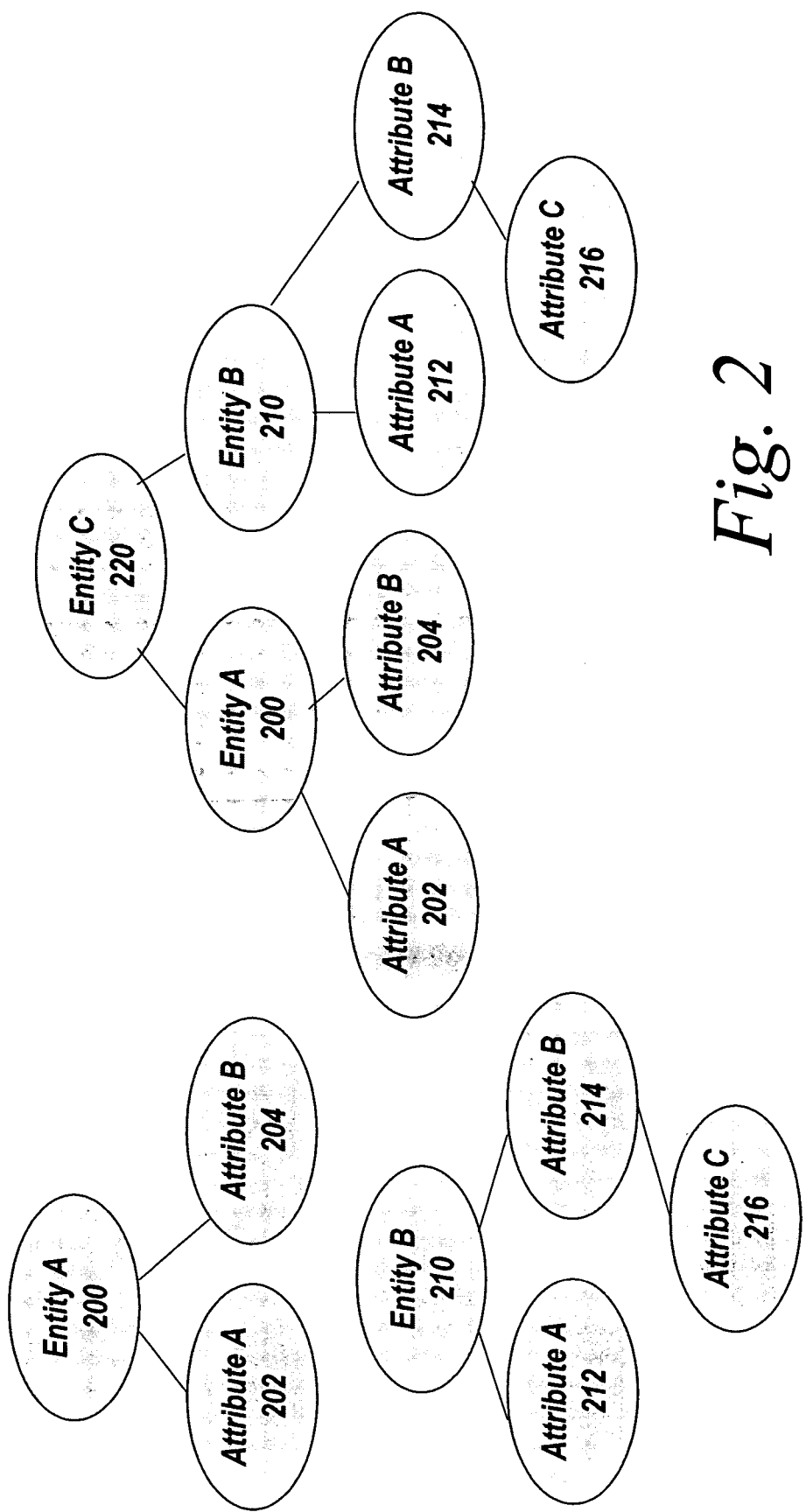
FIG. 2 depicts exemplary entities containing attributes.

For example, FIG. 2 depicts some of the hierarchical possibilities that are available with entities. Entity A (200) may include Attribute A (202) and Attribute B (204). Attributes A (202) and/or B (204) may be a (name, value) pair. Similarly, Entity B (210) may include a separate Attribute A (212) and Attribute B (214). Attribute B may further include Attribute C (216). It will be appreciated that the values for the attributes contained within Entity A (200) and Entity B (210) may be the same or they may be different. Entity C (220) may include both Entity A (200) and Entity B (210) as sub-entities.

The contained entities and attributes may be incorporated by value or by reference. For example, Attribute A (202) may be present in multiple instances of Entity A (200). Each of these instances may contain a copy of Attribute A (202) or a they may contain a reference to one Attribute A (202). In case of copies, the different instances of Entity A (200) may have different values of Attribute A (202). In case of references, the different instances of Entity A (202) share the same values of Attribute A (202). Access privileges can be set on the Entity A (202) to determine which instances of Entity A (200) are authorized to read values of Attribute A (202), to write values of Attribute A (202), to lock Attribute A (202) and prevent read/write access, possibly temporarily, etc. Similarly, combined entities such as Entity C (220) may contain entities incorporated by value or by reference and with like functionality as described for attributes.

The generation of entities can be automatic, or can be user-defined. User-defined entities allow users within a specific industry or users working on a specific application to define those attributes that are specific to their needs. One of the attributes specified may indicate that an entity may be a flattened entity. A flattened entity flattens the substructure of the entity when a combination entity is contained in another entity as a sub-entity. As a result of the flattening of the sub-structure, the composite entity information cannot be recovered if the combination entity is subsequently split apart. Combination entities are discussed further below.

After having the attributes defined, the entity can be incorporated into a DES model, or attributes can be defined for the entity while in the model, thereby providing user flexibility. Entities can further incorporate uncertainty into their behavior such as randomness, for example, via probability distributions associated with blocks generating each entity. These probability distributions can be representative of the probability of an entity being generated based upon a set of defined variables. Probability distribution can be user defined or can be generated automatically, such that a probability of an event occurring drives entity generation within the model. Furthermore, the generation of a probability distribution may be accomplished utilizing other applications or modeling environments.

It should further be noted that there can be a relationship between attributes and random numbers as well. When setting attributes of entities, the user can assign values based on input from separate environments (e.g., external modeling environments) to attributes in passing entities. Such separate environments can allow the values to be drawn from a probability distribution. For example, a random number generator can be used where each event is associated with a unique number produced by the random sequence generator. Dedicated hardware may be employed to obtain a sequence of random numbers with a given probability distribution, e.g., Gaussian, uniform, etc. The separate environment thus allows the attributes to be assigned samples from random variables. These random values can be used to introduce randomness in a controlled way to other parts of the model when they move into those parts of the model.

Figure 3:
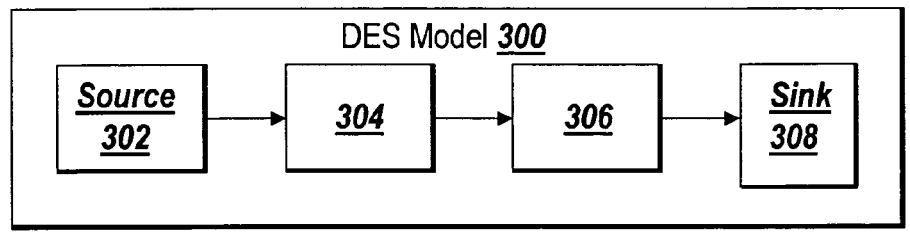
FIG. 3 depicts an exemplary DES model.

FIG. 3 depicts a sample DES model 300. The DES model 300 includes sources 302 and sinks 308 as depicted in FIG. 3. Sources 302 correspond to those blocks that allow data input into the DES model 300, while sinks 308 correspond to those blocks that remove entities from the model. A source in a DES model can take numerous forms. A source 302 can be an entity generator that produces one or more entities at fixed time intervals. Another example of a source 302 is an external operating environment outside of the DES model 300. For clarity, this external operating environment is not shown on FIG. 3. However, as an example, a block diagram modeling environment can be used as a source for a DES model, wherein a signal from the block diagram modeling environment can trigger the generation of an entity for use in the DES model 300 based upon criteria set by a designer/user of the DES model.

Sinks 308 in the DES model 300 can have functions other than terminating entities, such as returning arbitrary values from entities. A DES sink 308 can display all of the values passed to it by entities, or can display a defined set of values received from entities. Sinks 308 for use in the DES model 300 can also take various forms. One example of a sink 308 is a Terminator Block. The Terminator Block can be defined to accept all entities delivered to it, or in the alternative can block all or some entities delivered to it according to selected conditions. Another example of a possible form of sink 308 is a Scope Block. The Scope Block can accept an entity and present data from the entity, for example in a graphical manner by modifying the block icon or by modifying a graphical representation such as a trace in a separate window. This graphical depiction can allow a user to monitor the status of the DES model 300 as well as to view trends within the model graphically. A Display Block can also display selected attributes of an entity. Furthermore, a sink 308 can be a block that allows the export of date from the DES model 300 to an external environment. For example the DES model 300 can include a block that receives an entity and outputs a signal that may be used in a block diagram modeling environment.

Entities generally pass from sources 302 to sinks 308. Entities may traverse numerous intermediate blocks 304, 306 on the pathway from source 302 to sink 308. These intermediate blocks 304, 306 can be represented by numerous specialized DES blocks within a block library 105 provided in a DES modeling environment 100. These intermediate blocks 304 and 306 can have the same functionality as described above for the sinks. For example, the intermediate blocks can display all of the attributes passed to them, or can display a defined set of variables. The intermediate blocks 304 and 306 can have conditions to define which entities can pass through them. Scope Blocks can serve as intermediate blocks 304 and 306 that accept an entity and plot data from the entity in a graphical manner. Display Blocks can also display selected attributes of an entity. Furthermore the intermediate blocks 304 and 306 can include blocks that export data from the DES model 300 to an external environment, or import data, such as, for example, a signal or other input information, from an external environment.

Figure 4:
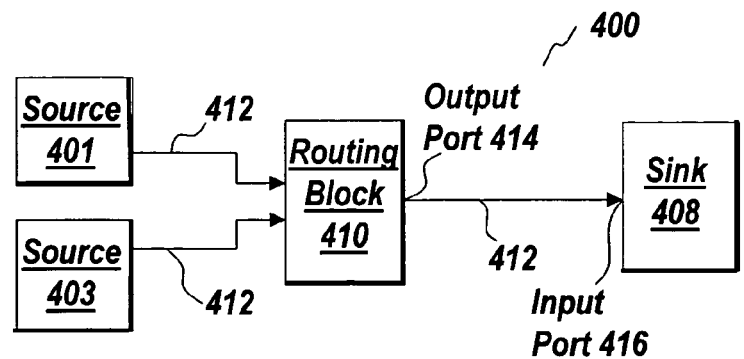
FIG. 4 depicts an example of an intermediate block between a source and a sink.

FIG. 4 depicts an example of a model 400 with an intermediate block between a source 401 and a sink 408. A Routing Block 410 may be placed between two source blocks 401, 403 and a sink block 408 such that only a subset of entities is passed to the sink block 408. The subset of entities is determined by the logic of the Routing Block 410 and the data that Routing Block 410 uses to determine the path from which the entity is allowed to arrive. Implementations of FIG. 4 can include additional intermediate blocks (not shown) that can include, but are not limited to, Logical Gates, Queuing Blocks, Storage Blocks, Routing Blocks, Execution Control Blocks, Server Blocks, Resource Allocation Blocks, Timer Blocks, Timeout Blocks, and Delay Blocks. Additionally, the DES modeling environment allows for users to customize and define their own blocks specific to the problem they are modeling and the model they have developed.

The path that an entity takes through the DES model 400 is referred to as an entity path 412. The entity path 412 is a connection from an entity output port 414 to an entity input port 416 on blocks within the DES model. For illustrative purposes in FIG. 4, an entity path 412 is represented by the line connecting the entity output port 414 of the routing block 410 and the input port 416 on the sink block 408. The entity path 412 in the DES model 400 is active only when an entity is passing through the entity path. At times during model execution when there is no entity passing through the entity path 412, the entity path has no value associated with it.

Further, there may be associated with each block in a DES model a state, wherein the state is a persistent data set corresponding to the block. The state variable of a block contains a set of attributes associated with the block (e.g., a Boolean operation, string, parsable string array) and may contain a sub state variable for nesting and combining hierarchies.

Within a DES model there can be numerous events. Events can be instantaneous occurrences that, for example, change a state variable, an output, a future event or any combination thereof. Events can be generated at any point at which a block within the DES model acts on an entity. Events can take substantially any number of forms, but, by way of example, can include the creation of a new data packet in a network, the exit of a package from loading dock, placement of an item on a conveyor belt in a manufacturing plant, etc.

In one implementation, events within a DES model may contain four characteristics associated with the event, namely, (1) each event may specify an entity, namely a set of data associated with the event, (2) each event may have time data associated with it, defining when the event is scheduled to occur, (3) events in a DES model may also have a priority associated with their execution, thereby defining the urgency of the event relative to other events that may occur at the same time, and (4) each event may have a destination object associated with it that serves to identify where the event is to take place. The destination object is typically a DES model block but is not required to be a DES model block. For example, the destination object can also be an entity.

Entities generated by an entity generator block can be forwarded to another block in the model by the queue block in accordance with user-defined values. For example, a user may instruct the queue to hold no more than 10 entities for forwarding. When the queue block has reached its maximum defined capacity, an input port to the queue block may be temporarily disabled thereby preventing the introduction of any more entities into the queue block. For example, the queue block may have a defined capacity of ten entities. When it is determined that the queue block has reached its defined capacity, the input port of the queue block is defined as unavailable.

When the number of entities within the queue block has decreased below the 10 entity limit, the input port to the queue block may be identified as available, thereby allowing the delivery of additional entities from the entity generator to the queue block. Entities within the queue block can be queued based upon the time at which they were generated by the entity generator, or they can be queued based upon numerous other arrangements. For example, a priority may be associated with various entities, and the queue block may queue entities based upon their priorities.

The DES model 109 may also include a terminator block which is a sink block within the DES model 109. The terminator block can be user-defined to accept all entities passed to it, or may have other functionality defined by a user. For example, the terminator block may be defined such that it blocks all entities delivered thereto. In another implementation, the terminator block may produce an error message upon arrival of an entity.

Figure 5:
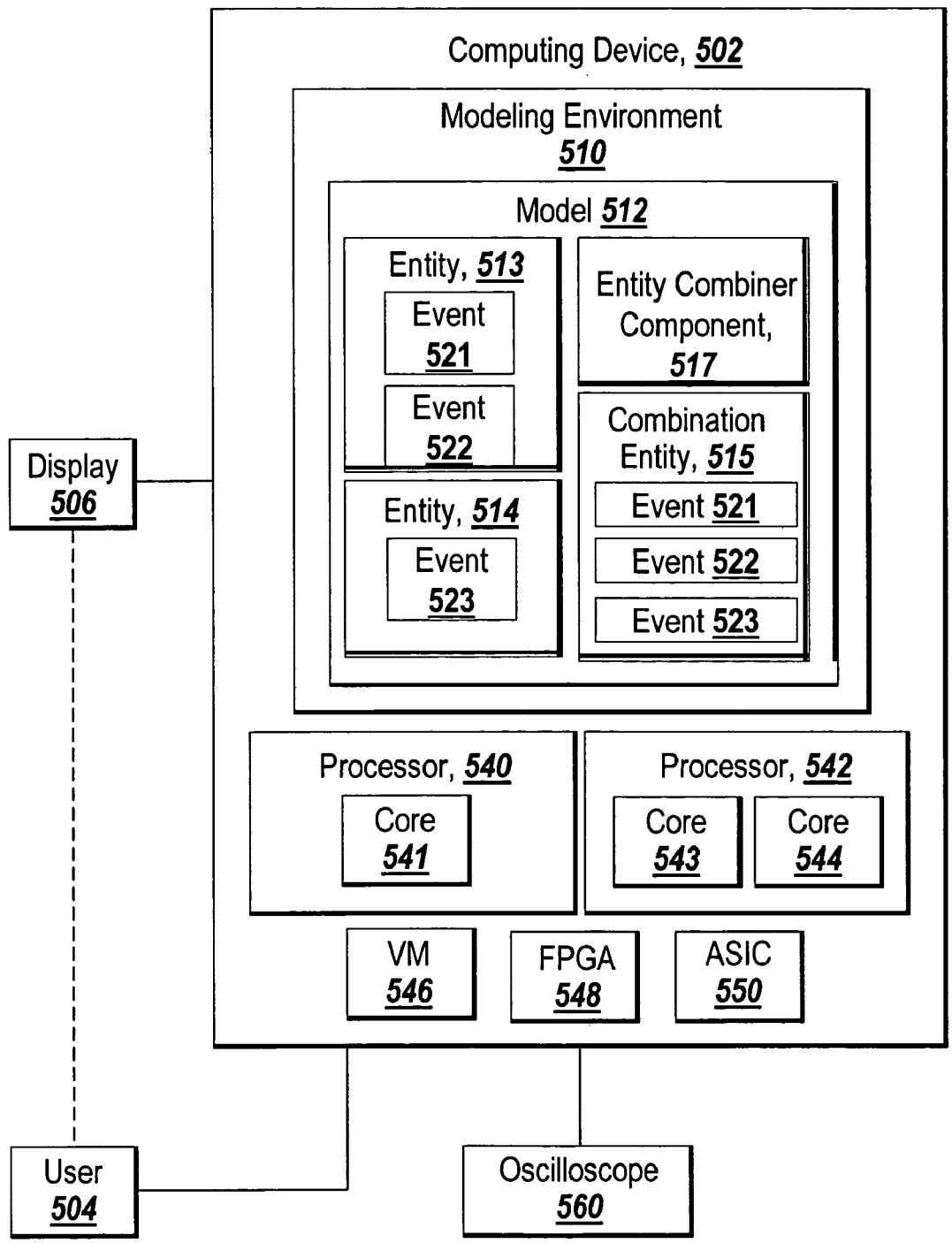
FIG. 5 depicts an environment suitable for practicing an exemplary embodiment of the present invention.

FIG. 5 depicts an environment suitable for practicing an embodiment of the present invention. A computing device 502 hosts a modeling environment 510. The computing device 502 may be a workstation, server, laptop, mainframe, PDA or other computing device equipped with a processor or processors 540 and 542 and able to support the modeling environment 510. The computing device 502 may have a single processor or multiple processors 540 and 542 and each of the processors may have one core 541 or multiple cores 543 and 544. The computing device 502 may use hardware acceleration to execute modeling environment 510 and may run code on a Field Programmable Gate Array (FPGA) 548 or an Application Specific Integrated Circuit (ASIC) 550. The computing device 502 may also execute code in one or more virtual machines 546.

The modeling environment 510 may be a graphical modeling environment such as a block diagram modeling environment or a state-based modeling environment. The graphical modeling environment 510 may also be a DES modeling environment. Alternatively, the modeling environment 510 may be a textual modeling environment. The modeling environment 510 includes at least one model 512 that generates multiple entities 513 and 514. The entities 513 and 514 may include associated events 521, 522 and 523. It should be appreciated that the events may be related to the entities rather than included within the entity as an element of the entity data structure. The term "associated event" as used herein is meant to refer to both events that are a part of the entity data structure and events that are related to the entity without being part of the entity data structure. In one implementation, the events 521, 522 and 523 may be timeout events. In other implementations, events 521, 522 and 523 may be another type of event, such as a firing event, an extraction event, etc.

The model 512 also includes a combination entity 515 which is created from other entities 513 and 514 in the model 512. The combination entity 515 includes the associated events from the entities 513 and 514 from which the combination entity was created. The model 512 may also include a entity combiner component 517, such as an entity combiner block, that accepts two or more entities and creates a combination entity. It should be noted that while the events 521, 522 and 523 are shown inside the combination entity 515 for ease of illustration, the combination entity 515 could also have been depicted as containing entities 513 and 514. It should further be appreciated that although the entity combiner component has been shown and discussed as a separate stand-alone block, both here and throughout the description of the present invention, the functionality of the entity combiner component may also appear as additional functionality that is included within other non-dedicated components.

A user 504 may view the results of the execution of the model 512 on a display 506 in communication with the computing device 502. The computing device 502 and modeling environment 510 may also be in communication with additional target environments such as an oscilloscope 560. The output of the execution of the model 512 may be sent to a target environment.

Figure 6:
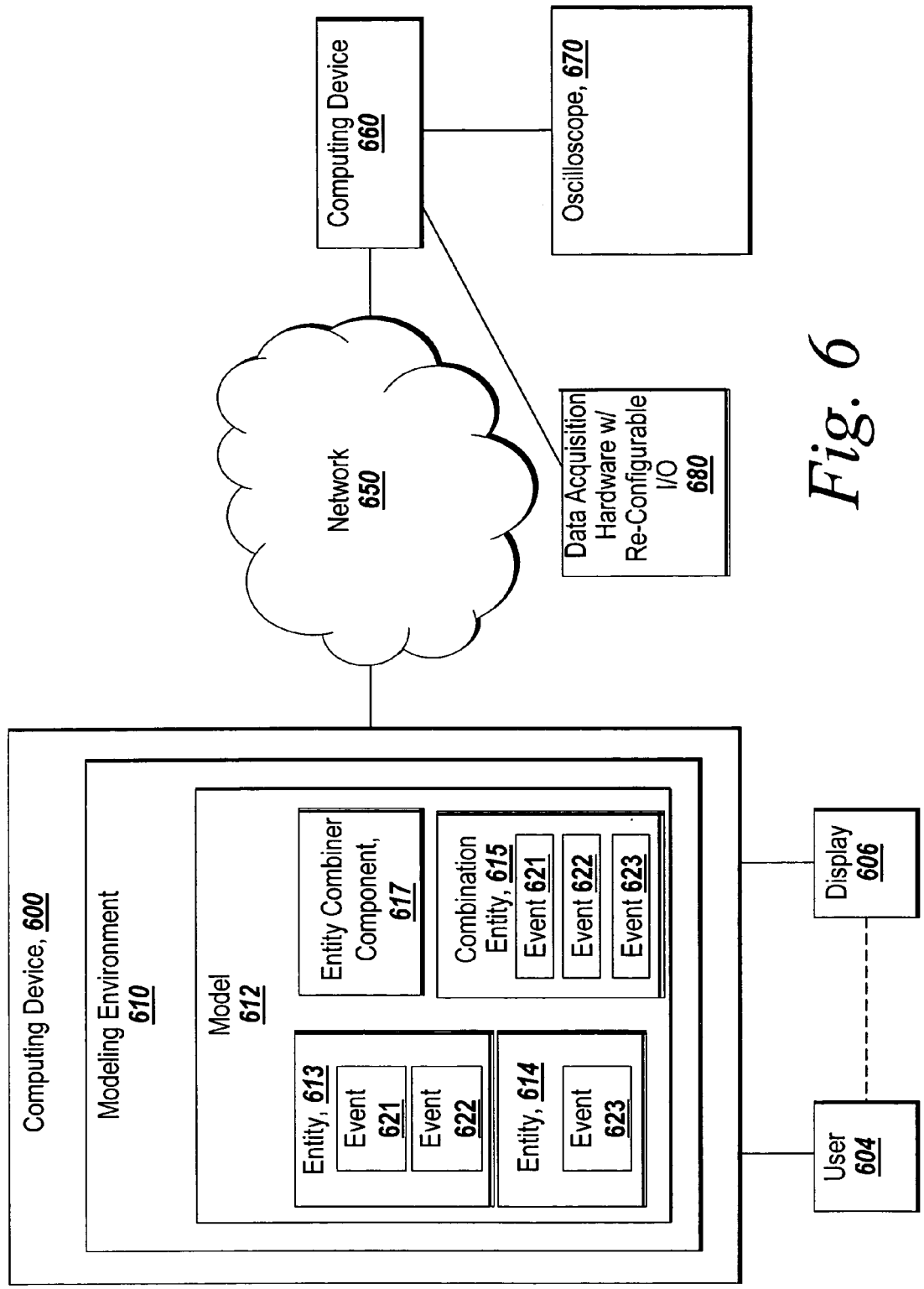
FIG. 6 depicts an alternative distributed architecture suitable for practicing an exemplary embodiment of the present invention.

A distributed architecture may also be employed to execute a model that includes a combination entity. FIG. 6 depicts an alternative distributed architecture suitable for practicing an embodiment of the present invention. A computing device 600 may support a modeling environment 610 which includes at least one model 612. The model 612 may include entities 613 and 614 that include associated events 621, 622 and 623 respectively. A combination entity 615 may be created by combining at least some portion of the model entities 613 and 614. The combination entity 615 may include events 621, 622 and 623 from the other model entities 613 and 614. A user 604 may view the output from the execution of the model 612 on a display 606 that is in communication with the computing device 600.

The computing device 600 may also communicate over a network 650 with a remotely located computing device 660. The network 650 may be a Local Area Network (LAN), a Wide Area Network (WAN), an intranet, the Internet, a wireless network or some other type of network that allows the computing device 600 to communicate with the remotely located computing device 660. The remotely located computing device 660 may be in communication with a target environment such as an oscilloscope 670 or data acquisition hardware with a reconfigurable input/output 680 that is communicating with the remotely located computing device and which receives the output from the execution or provides input to the execution of the model 612.

A model may allow for the transfer of information to various blocks within the modeling environment, as well as to environments outside of the model. For example, the use of a terminator block as a sink may allow for acceptance of all entities within the model. In place of or in conjunction with the terminator block, a scope block may be utilized to accept an entity and plot data from an attribute of the entity. Data plotted may include a plot of information related to entities experiencing a discrete event or a discrete state. Utilizing a scope block a user can visually verify the operation and performance of a model. Additionally, a display block may be associated with a model such that the value of an attribute of an entity is graphically displayed. A model may further include blocks that allow the export of entity attribute values to regions outside of the modeling environment. For example, individual entity priority data may be exported to an external modeling environment. Control of export of data from this block may take place within the modeling environment, may be controlled by an external environment, or may be a combination of both. In light of this, when modeling complex systems, the model may be incorporated into other modeling and display applications. In the alternative, the model may operate in a stand-alone configuration, wherein a system to be modeled may be modeled solely within the modeling environment.

The combination entity may be used to process many different types of events occurring in many different types of models. However, in order to further explain the present invention, a number of examples discussing timeout events in a DES model in general and the processing of timeout events using a combination entity in particular will now be given.

Figure 7:
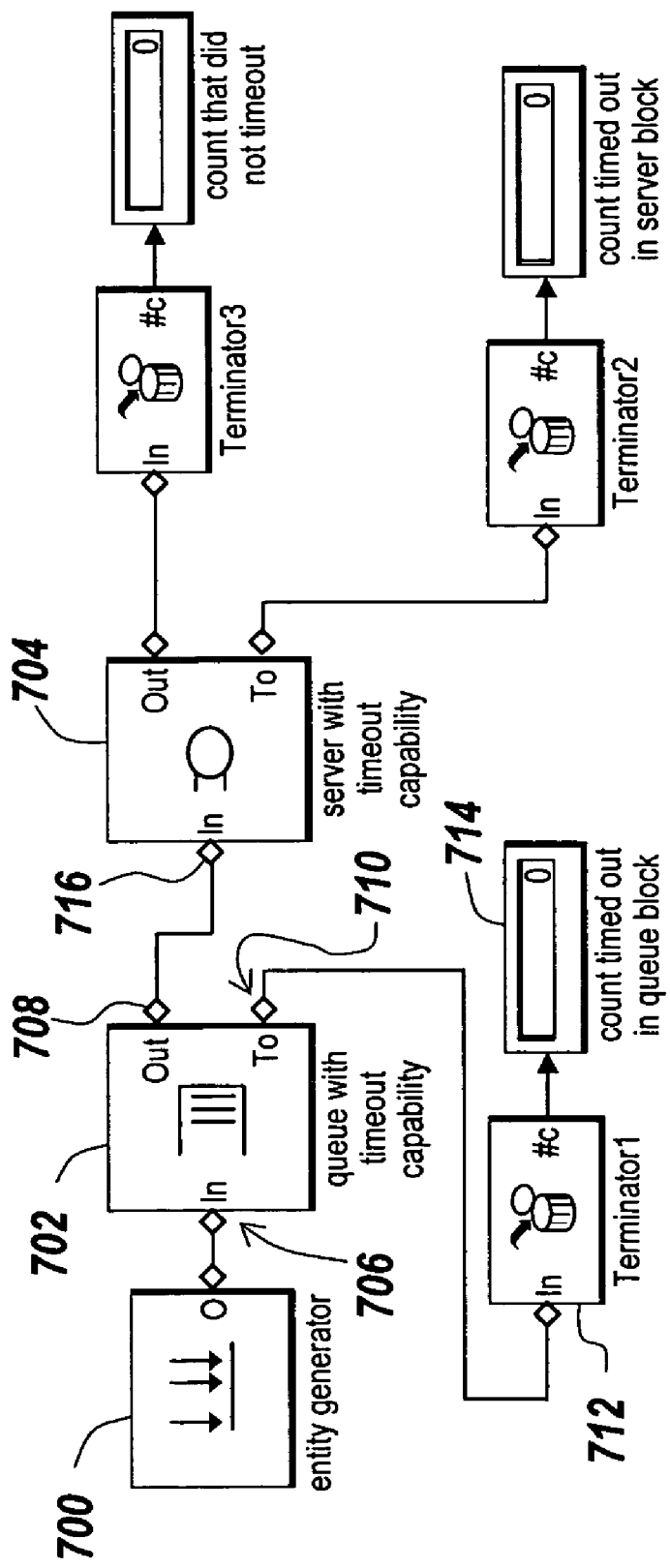
FIG. 7 depicts a local timeout context in a DES model.

FIG. 7 illustrates a local timeout context in an exemplary DES model. It will be appreciated that while a local timeout context is shown in FIG. 7, alternative implementations of FIG. 7 may use other types of events that may or may not include timeout contexts. In FIG. 7, an exemplary entity generator block 700 passes entities to a queue with timeout capability block 702. The queue with timeout capability block 702 sends entities via output port 708 to a server with timeout capability block 704 or via output port 710 to Terminator1 block 712.

The server with timeout capability block 704 is a server block in which a timeout port has been enabled. As noted above, entities ordinarily stay in a server block for a predetermined amount of time before attempting to leave via an unblocked out port. However, when the server has timeout capability (i.e.: the timeout port has been enabled), the departure of the entity from the block occurs at the earlier of the occurrence of a timeout event for the entity or the ordinary scheduled time the entity is supposed to leave via the out port. In the case of the occurrence of the timeout event, the entity departs not via the out port but rather via a specialized timeout port (marked To in the Figure).

Continuing the discussion of FIG. 7, Terminator1 block 712 sends entities to a count timed out in queue block 714 that counts the number of entities with expired timeout functions occurring in the queue with timeout capability block 702. The server with timeout capability block 704 can further pass entities to two other terminator blocks.

A local timeout context may start when an entity enters a block that can store entities, such as the queue with timeout capability block 702. The entity generator block 700 generates entities and passes them to queue with timeout capability block 702. Upon an entity entering queue with timeout capability block 702 via the input port 706, a timeout function starts and upon the entity leaving the queue with timeout capability block 702 via the output port 708, the timeout function is canceled.

Each timeout function is configured to associate with an entity and to expire after a selected time period. If the selected time period is reached, and the entity is still in the queue with timeout capability block 702, the timeout function expires and the entity is sent out of port 710 and a timeout processing operation can be implemented. Timeout processing may or may not have any logical relationship to the local timeout context. In the illustrative example in FIG. 7, the timeout processing consists of sending the entities to the Terminator) block 712 and a count timed out in queue block 714 that counts the number of entities that the queue block 702 sends for timeout processing.

Once an entity leaves the queue with timeout capability block 702 via output port 708, and upon entry via input port 716 into a server with timeout capability block 704, a new timeout function starts. The new timeout function associated with the entity starts in the server with timeout capability block 704 and has no association with the previous timeout function started in the queue with timeout capability block 702. Thus, a timeout function with a local timeout context operates within the boundaries of a single block within the DES model.

The modeling environment may also support regional timeout functionality. Typically, in a regional timeout context, a timeout function may start when an entity enters a region of blocks marked by a begin timeout block. The timeout function may be cancelled when the entity passes through an end timeout block. However, if the timeout function expires before the entity reaches the end timeout block, the entity may be removed from wherever it is and be sent to a block port of a block such as a target of the timeout. A target block can be, for example, a begin timeout block, and an end timeout block or another target block that sends the entity to a special timeout port to begin timeout processing. The target block may or may not have a logical relationship with the regional timeout context. A timeout function with a regional timeout context operates within a region of blocks. The timeout processing may or may not have any logical relationship to the regional timeout context.

The modeling environment may also support hierarchical timeout capability. A timeout function having hierarchical timeout functionality operates within a subsystem. If a timeout function expires before the entity reaches a subsystem output port, the entity is removed from wherever it is in the subsystem and redirected, for example, by manager 101 from FIG. 1, to a target block outside of the subsystem where the timeout function expires. The target block may or may not have a logical relationship with the hierarchical timeout context. The target block can be a block or in another subsystem that is hierarchically above the subsystem that defines the hierarchical timeout context. It will be appreciated that the subsystem with a hierarchical timeout context can have a special output port that sends each of the entities with expired timeout function for timeout processing. In one implementation, the manager 101 acts as a director that directs where an entity goes upon expiration of its timeout function. Those skilled in the art will appreciate that a hierarchical timeout context is not meant to be limited to a subsystem, and is equally applicable to other hierarchical components. For example, hierarchies can be applied to other event types.

The modeling environment may also support models with both regional event functionality and global event functionality. For example, in one implementation regional timeout functionality and global timeout functionality may be supported. A block diagram may contain an entity path which only has a begin timeout block and has no end timeout block. The timeout context within such a path becomes global to the entire model, and is not restricted within a block, a region or a subsystem. In a global timeout context, a timeout function will always expire, unless an entity reaches a terminator block where it exits the model before the timeout function expires. The target block that outputs entities for timeout processing can be a separate block that is dedicated to only (1) being the 'target' of where an entity goes upon expiration of its timeout function, and (2) outputting the entity immediately. It should be recognized that entities with expired timeout functions in a different context do not need to be sent to the same location, and it is equally valid to send the entities with different timeout contexts to different locations for timeout processing. The global timeout processing may or may not have any logical relationship with either the regional or global timeout context.

The target block that accepts entities from the timeout function and then outputs them for timeout processing may take at least three different forms. In accordance with a first example form, the target block is within the particular timeout context. In accordance with a second example form, the target block is outside of the particular timeout context. In accordance with a third example form, the target block is a separate block not connected to the main model.

The manager 101 for the modeling environment may include a number of components used to process timeouts. The timeout function is initiated by an initiator in the manager upon occurrence of a start condition. The start condition may be represented by the entity passing through a port of a block within the DES model. Alternatively, the start condition may be represented, for example, by the entity passing through one of an input, output, and a control port of a block within the DES model. In addition, the start condition may be represented, for example, by the entity entering a block of the DES model and/or the entity exiting a block of the DES model. In yet another alternative, the start condition may be represented by a state change of a state-based subsystem within the DES model. The start condition may also be represented by an event that occurs outside of the DES model but that interacts with the model. It should be recognized that there are many other possible representations of a start condition, and the examples mentioned herein are not meant to be limiting.

The manager 101 may also include a terminator element that terminates or resets the timeout function. The timeout function is terminated or reset upon occurrence of an end condition. The end condition may be represented, for example, by the entity passing through a port of a block within the DES model, by the entity passing through one of an input, output, and a control port of a block within the DES model or represented by the entity entering a block of the DES model and/or the entity exiting a block of the DES model. Alternatively, the end condition may be represented by, for example, a signal from a time-based subsystem within the DES model or represented by a state change of a state-based subsystem within the DES model. It will be appreciated that there are many possible representations of an end condition, and the examples mentioned herein are not meant to be limiting. In addition, the start condition and/or the end condition can include, for example, actions by a user, other input to the model, or other external events that are distinct from the model, including conditions triggered by the operating system or by real time.

The timeout processing may remove the entity from a part (e.g., block, subsystem or region) of the execution system, remove the entity from the execution system entirely, end the execution of the DES model, or alter the entity generation characteristics of the DES model. It should be recognized that many other actions may be initiated for timeout processing as a result of an expired timeout function. Accordingly, the examples mentioned here are not meant to be limiting.

It should be noted that the DES models discussed above may be a discrete event subsystem within a time-based system or a state-based system. It should further be recognized that a signal from a time-based system or subsystem and a state-change in a state-based system or subsystem can start and stop a timeout function within a discrete event model. The timeout function can also be started and stopped by events outside of the DES model but that are interacting with it. For example, a trigger event generated by an oscilloscope my start or stop a timeout event in a DES model that it interacts with. Additionally, it should be noted that a discrete event model can be simulated in a discrete event execution environment. The execution may be implemented in a time-driven or event-driven manner, where a time-driven approach employs numerical integration schemes to integrate forward in time and an event driven approach often relies on an event calendar to move time forward by jumping to the next event time.

Figure 8A:
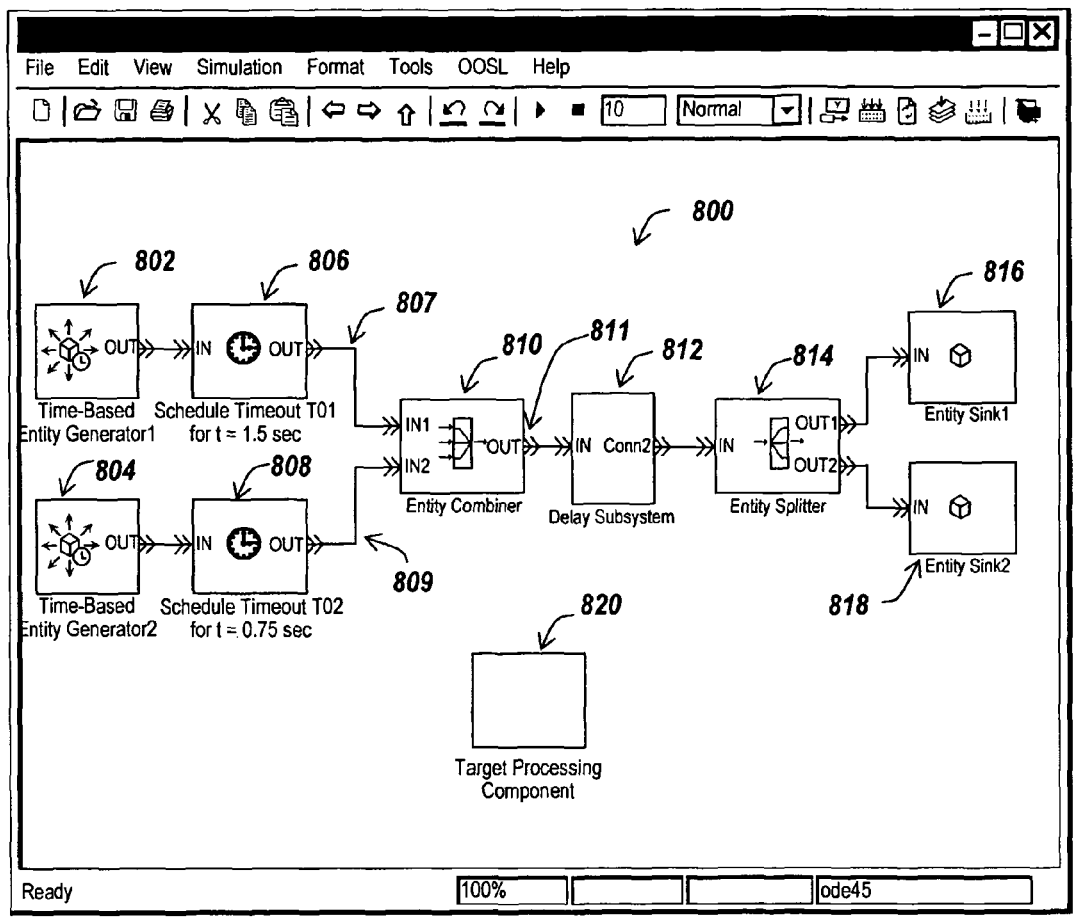
FIG. 8A depicts a DES model with an entity combiner component and target processing component.

Exemplary embodiments may provide a framework for processing combination entities holding multiple events. A configurable environment is provided that enables the use of combination entities by defining default and customizable rules for the handling of events embedded in a combination entity. FIG. 8A depicts an exemplary model 800 suitable for practicing the present invention. Time-based entity generators, such as a first time-based entity generator1 block 802 and a second time-based entity generator2 block 804, generate first and second entities that are provided as input to timeout block components 806 and 808 respectively.

Timeout block components 806 and 808 assign timeouts to the first and second entities generated by time-based entity generator1 block 802 and time-based entity generator2 block 804. The entity on path 1 (807) has a timeout TO1 that expires at t=1.5 sec. Similarly, the entity on path 2 (809) has a timeout TO2 that expires at t=0.75 sec. An entity combiner block 810 combines the first and second entities from the two input paths 807 and 809 to form an aggregate or combination entity. The combination entity is formed at the output 811 of the entity combiner block 810. The combination entity by default may contain both the first and second entities and their timeout information. In one embodiment the composite entity may be configured to keep all of the timeouts, cancel all timeouts from the original (first and second entities in the example of FIG. 8A) entities, compute a derived timeout such as an average or medium, or keep certain timeouts (e.g., user-specified timeouts) while canceling other timeouts. The model 800 may include a delay subsystem block 812, an entity splitter block 814, and an entity sink 1 block 816 and entity sink2 block 818. The entity splitter block 814 may split a combination entity into its component parts.

In one embodiment the entity combiner block 810 can operate using only one input port. In such a case the resulting combination entity may contain only the single inputted entity. The outputted entity is a combination entity even though it contains only one other entity. In another embodiment, the entities that are inputted into the entity combiner 810 may be combined entities. When the input entities are combined entities, the outputted entity contains sub-entities that are combined entities. This allows entities to be nested to arbitrarily deep levels. Alternatively, the sub-structure may be flattened into a flattened entity as discussed above with reference to FIG. 2.

If the combination entity reaches the termination components entity sink 1 block 816 and entity sink2 block 818 during the execution of the model, the timeouts in the combination entity may be cancelled and the termination/end processing takes place as discussed above. If a timeout event occurs (the timeout expires) prior to the composite entity, or its split children entities (created by means of the entity splitter block 814) reaching the termination components/sinks 816 and 818, the combination entity may leave its current location via a special entity port in its current location and is transferred by the DES manager 101 to a target processing component block 820 for timeout processing. The entities may also be combined in a way that disables the ability to execute the timeout. If a timeout is disabled, the execution of its timeout is suspended (or pending) until the timeout is enabled. After enablement, the timeout can be executed.

When a timeout expires, the initiating of the timeout handling may be nondeterministic. So, the timeout handling may be affected as soon as the timeout expires, but it is not required. Instead the timeout handling may occur at any time after the timeout expires but before the timeout is cancelled.

Once a timeout occurs, the timeout may be handled in a number of different ways depending upon how the modeling environment or the particular model has been configured. For example, the DES Manager 101 may, in response to the expiration of the first timeout, transfer the combination entity (including both components) from its current place via an entity port in its current location. For example, for the model 800 depicted in FIG. 8A, the entire composite entity would leave at t=0.75 even if that timeout was part of only the second entity that was combined into the combination entity. Alternatively, the component entity of the combination entity (the combination entity has both the first entity and second entity as components) that has the expired timeout may be transferred by the DES manager 101 from its current place via an entity port.

For example, in the model 800 in FIG. 8A the second component entity will leave its current location at t=0.75 when the TO2 timeout expires. This implementation results in a composite entity with only component 1 with timeout TO1. Put another way, the original component entity that included the expired timeout is stripped out of the combination entity and sent for timeout processing. The combination entity, minus the removed component, remains in the model for execution. In an additional implementation, one or more timeouts remaining in the combination entity after the component entity has been stripped out may be cancelled in response to the expiration of the timeout in the component.

In an additional implementation, the modeling environment or a given model may be configured so as to act on timeout events based on a combination of multiple timeouts of component or composite entities. For example, the user may specify that the combination entity will timeout only when both a first and second timeout in the combination entity expire. A more complicated case can be imagined with multiple timeouts for a single entity where the execution of timeouts is a logical combination of timeouts, TO1, TO2, . . . . Similarly, the combination entity or the affected components may be configured so that the combination entity or specific components are sent for timeout processing based on a subset (specifically or non-specifically identified) of the total number of timeouts. It will be appreciated that although the example above has been discussed with reference to a first and second entity and a first and second timeouts being combined in the combination entity, a larger number of entities and their associated timeouts may also be combined in the combination entity discussed herein.

The entity combiner block can operate in a mode that does not retain the structure of the combination entity. In this mode, the entity combiner block copies the attributes from the input entities to the output entities. Using this mode, the timeouts are transferred from the input entities to the output entity.

In one embodiment, the expiration of the first timeout in a combination entity may cause the generation of a user interface that is presented to a user that displays the attributes and timeout information for a combination entity. The user interface may allow the user to selectively cancel or otherwise edit or add timeouts in the combination entity. Additionally, a user interface may be provided that allows the user to directly configure one or more of the entity combiner block 810, target processing block 820 and termination components entity sink1 block 816 and entity sink2 block 818 so that the DES modeling environment will programmatically enforce the user's selections regarding the processing of timeout information for a combination entity.

Figure 8B:
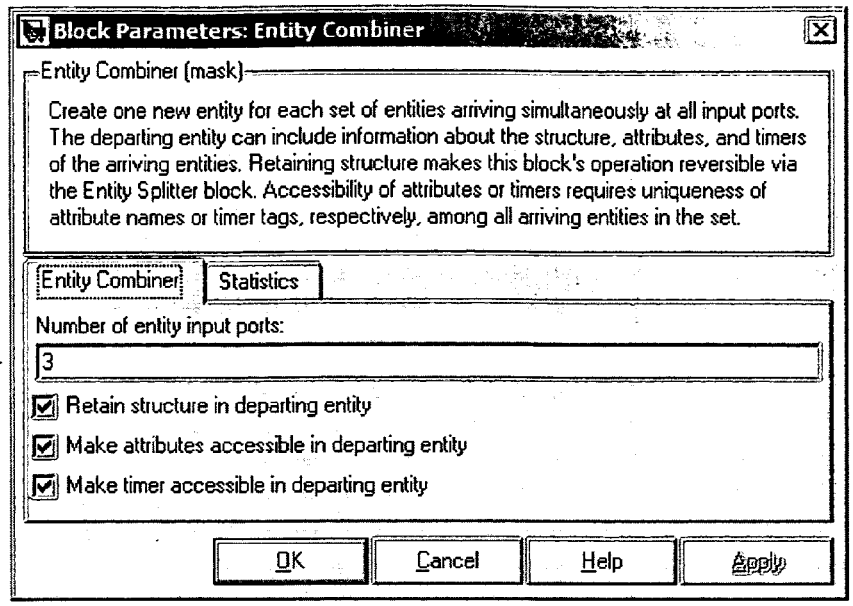
FIG. 8B depicts a user interface which enables the configuration of an entity combiner component.

FIG. 8B depicts an exemplary user interface which may be used to configure attribute parameters for an entity combiner block. The user interface 840 allows a user to specify the number of entity input ports 841 for the entity combiner block. The user is also able to specify whether or not to retain structure in the departing entity 842. If the retain structure parameter is checked, the departing entity carries information about the number of component entities and which attributes and timers each component entity possesses. This retained information may be used to recover an original component from the combination entity using an entity splitter block. If the retained structure box is unchecked, the flattened entity structure discussed above with relation to FIG. 2 is created. The user interface 840 also allows a user to select whether or not to make attributes accessible in a departing entity 843. If this attribute is checked, a user can access attributes from the component entities via the departing combination entity. Additionally, in the exemplary user interface 840 the user may select an option making a timer accessible in a departing entity 844.

Figure 8C:
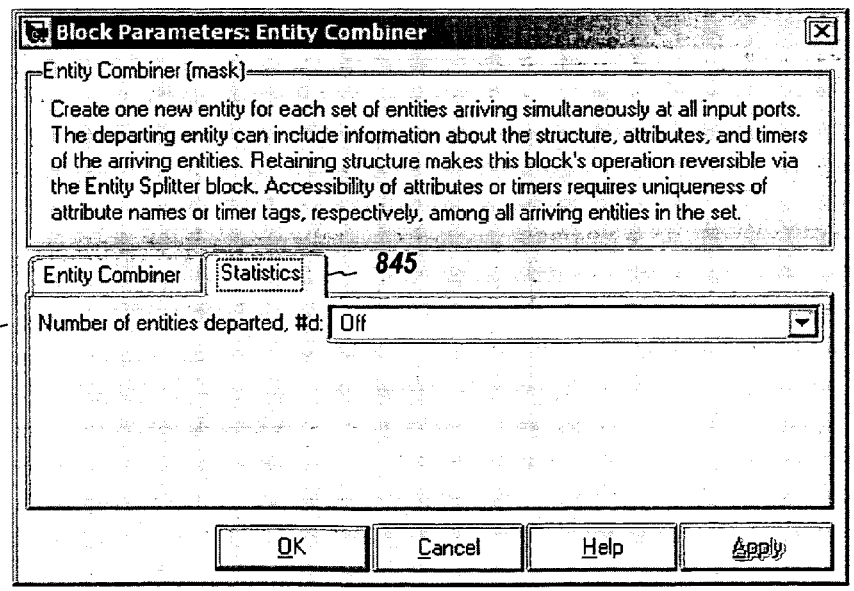
FIG. 8C depicts a user interface which enables further configuration of the entity combiner component of FIG. 8B.

The exemplary user interface 840 also includes a statistics tab 845 that when selected exposes an additional statistical parameter as shown in FIG. 8C. The user interface 840 enables the user to specify whether or not to track the behavior of a signal output port 846. When the option is selected from a pull-down menu, the selection controls the presence and behavior of a signal output port labeled '#d' in one implementation.

Figure 9:
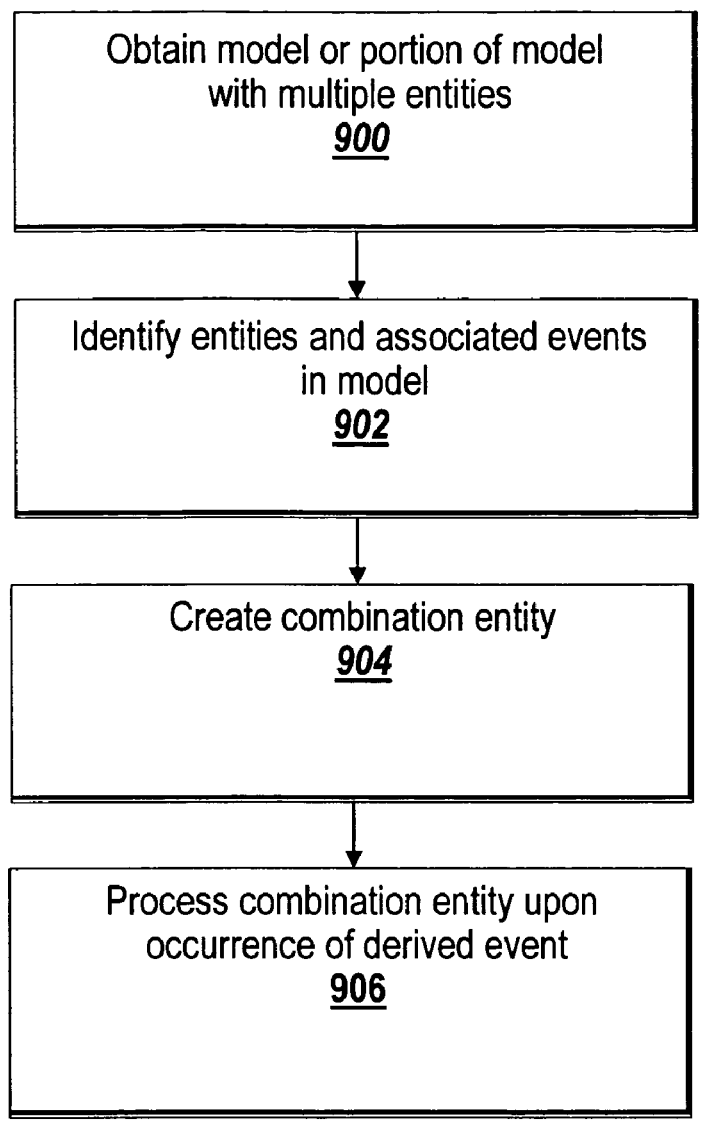
FIG. 9 is a flowchart of a sequence of steps that may be followed by an embodiment of the present invention to process timeouts in combination entities.

FIG. 9 is a flowchart illustrating exemplary processing that may be followed by an exemplary embodiment to process multiple timeouts in a combination entity. The sequence begins by obtaining a model or a portion of a model with multiple entities in a modeling environment (step 900). The entities and any associated events are then identified (step 902). A combination entity is then created from the identified entities. The combination entity includes at least one event derived from one or more associated events for the identified entities used to form the combination entity (step 904). The derived event may be based upon one or more associated events for the entities used to form the combination entity. The derived event may be based upon a minimum or maximum event time for the associated events used to form the combination entity. The deriving of the entity may also compute a mean, median, weighted average, or sum, of at least one event time associated with the entities used to form the combined entity. In one embodiment, the combination entity is created via the use of a combination entity combiner component. The combination entity is then processed based upon the occurrence of at least one of the included events (step 906).

In one embodiment at least one entity combined into the combination entity is processed separately from another one of the entities combined into the combination entity in response to the occurrence of at least one derived event.

Figure 10:
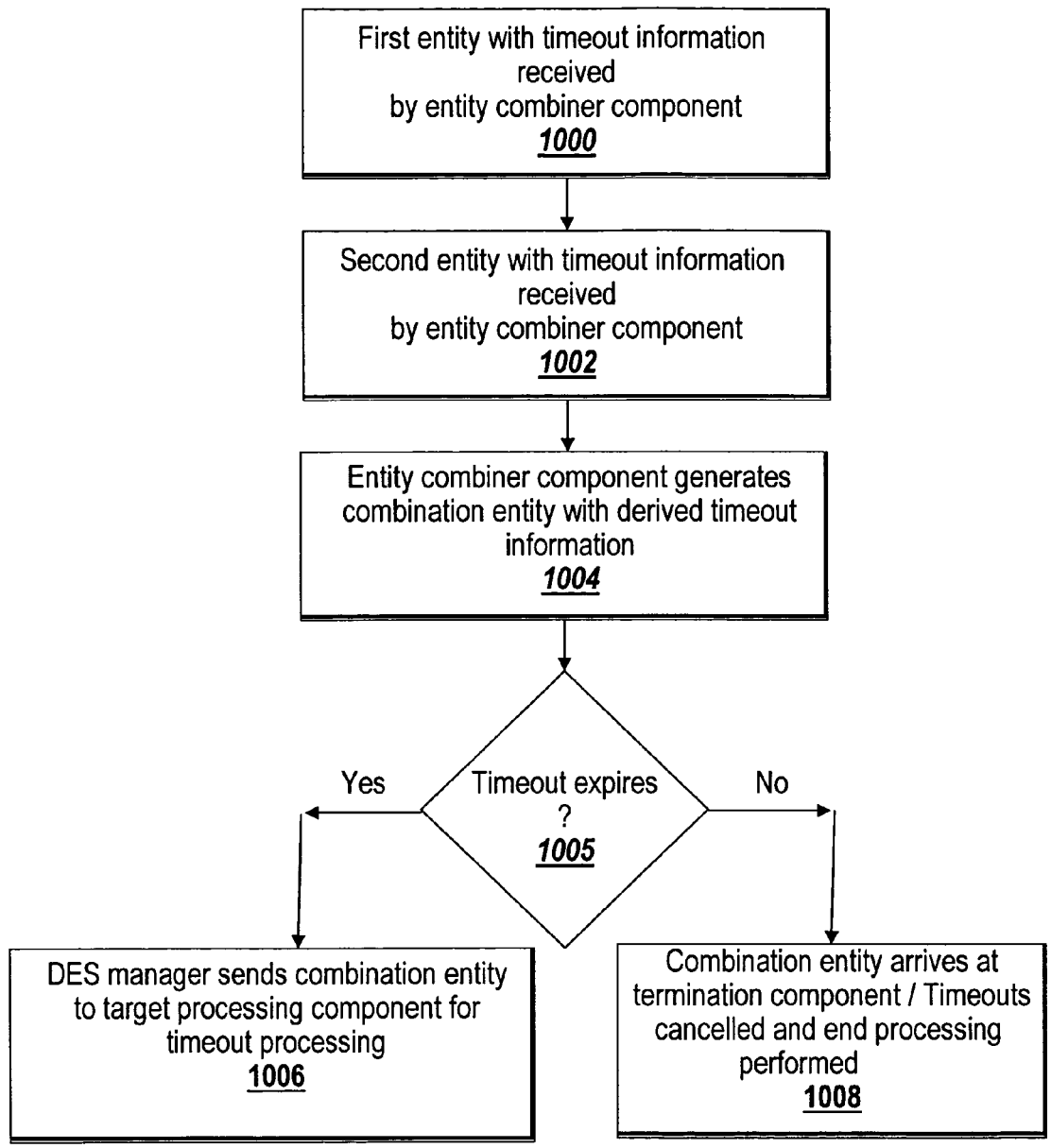
FIG. 10 is a flowchart of a sequence of steps that may be followed by an embodiment of the present invention to process timeouts in combination entities.

FIG. 10 depicts a more detailed explanation of the handling of events contained in combination entities. FIG. 10 depicts a flowchart of a sequence of steps that may be followed by an embodiment to process timeouts in combination entities. The sequence begins when the first entity with timeout information is received by an entity combiner component (step 1000). Subsequently, or at the same time, a second entity with timeout information is received by the entity combiner component (step 1002). The entity combiner component then generates/assembles a combination entity that includes both entities and timeout information derived from the associated timeout information for the received entities (step 1004). The derived timeout information may be based upon one or more associated timeout values for the entities used to form the combination entity. The derived timeout information may be based upon a minimum or maximum timeout value for the associated events used to form the combination entity. The deriving of the timeout information may also compute a mean, median, weighted average, or sum, of at least one timeout value associated with the entities used to form the combined entity. If the timeout does not expire (step 1005) before the execution of the model transmits the combination entity to a termination component, the timeouts in the combination component are cancelled and the combination component undergoes end processing (step 1008). Alternatively, if the timeout does expire (step 1005) before the execution of the model transmits the combination entity to a termination component, the combination entity is transferred (or a component in the combination entity is transferred depending upon the implementation) to a target processing component where the combination entity or component undergoes timeout processing (step 1006). It should be appreciated that further processing may also occur and time may expire between the time a timeout expires and the transfer of an entity to a target processing component.

The present invention may be provided as one or more computer-readable programs embodied on or in one or more mediums. The mediums may be a floppy disk, a hard disk, a compact disc, a digital versatile disc, a flash memory card, a PROM, an MRAM, a RAM, a ROM, or a magnetic tape. In general, the computer-readable programs may be implemented in any programming language. Some examples of languages that can be used include MATLAB, FORTRAN, C, C++, C#, Python, JavaScript, or Java. The software programs may be stored on or in one or more mediums as object code. Hardware acceleration may be used and all or a portion of the code may run on a Field Programmable Gate Array (FPGA), an Application Specific Integrated processor (ASIP), or an Application Specific Integrated Chip (ASIC). The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A computing device implemented method for processing events in a modeling environment, the method comprising:
    creating a combination entity formed from a plurality of entities in a model of a system, the combination entity being created by an entity combiner component in the model, the combination entity including at least:
        two or more entities from the plurality of entities, and
        a derived event that is derived from at least one event associated with one or more entities included in the combination entity; and
    processing the combination entity based upon an occurrence of the derived event included in the combination entity.

2. The method of claim 1, further comprising:
    deriving the derived event from at least one event associated with one or more entities included in the combination entity, wherein the deriving includes selecting at least one event associated with one or more entities included in the combination entity.

3. The method of claim 2, wherein a selected event has at least one minimum or maximum event time of events associated with one or more entities included in the combination entity.

4. The method of claim 1, further comprising:
    deriving the derived event from at least one event associated with one or more entities included in the combination entity, wherein the deriving includes computing at least one of a mean, median, weighted average, or sum, of at least one event time associated with one or more entities included in the combination entity.

5. The method of claim 1, wherein at least one of the entities included in the combination entity is processed separately from another one of the entities included in the combination entity in response to the occurrence the derived event.

6. The method of claim 1 wherein the modeling environment is a graphical modeling environment.

7. The method of claim 6 wherein the graphical modeling environment is a discrete event system (DES) modeling environment.

8. The method of claim 1, further comprising:
    receiving the plurality of entities as input to the entity combiner component; and
    outputting the combination entity from the entity combiner component.

9. The method of claim 1 wherein at least one event, associated with an entity contained in the combination entity, is a timeout event.

10. The method of claim 1 wherein the combination entity includes data copied from one or more entities included in the combination entity.

11. The method of claim 1 wherein at least one event, associated with an entity included in the combination entity, is based on:
    an inspection of an attribute,
    a viewing of an attribute,
    a movement of an entity,
    an execution of logic within an entity,
    a receipt of an enabling signal in the model, or
    a receipt of a disabling signal in the model.

12. The method of claim 1 wherein at least one event, associated with an entity included in the combination entity, is based on:
    a receipt of an entity at an input port,
    a receipt of an entity at an output port,
    an exiting of an entity from an input port, or
    an exiting of an entity from an output port.

13. The method of claim 1 wherein at least one event, associated with an entity included in the combination entity, is based on:
    an execution of logic within an entity,
    an execution of logic in a state chart, or
    an execution of logic within a block diagram.

14. The method of claim 1 wherein at least one event, associated with an entity included in the combination entity, is based on information received from an external computing environment that interacts with the model.

15. A computing device implemented system for processing events in a modeling environment, the system comprising:
    one or more processors for performing an execution of a model in the modeling environment, the execution of the model including:
        generating a plurality of entities in the model, one or more of the plurality of entities being associated with one or more events,
        generating a combination entity formed from the plurality of entities, the combination entity being generated by an entity combiner component in the model, the combination entity including at least:
            two or more entities from the plurality of entities in the model, and a derived event that is derived from one or more events associated with one or more entities included in the combination entity, and processing the combination entity based upon an occurrence of the derived event.

16. A physical medium for use with a computing device, the medium holding instructions for processing events in a modeling environment, the instructions comprising one or more instructions for:

creating a combination entity formed from a plurality of entities in a model of a system, the combination entity being created by an entity combiner component in the model, the combination entity including at least:

two or more entities from the plurality of entities, and a derived event that is derived from at least one event associated with one or more entities included in the combination entity; and processing the combination entity based upon an occurrence of the derived event.

17. The medium of claim 16 further comprising one or more instructions for:

deriving the derived event from at least one event associated with one or more entities included in the combination entity, wherein the deriving includes selecting at least one event associated with one or more entities included in the combination entity.

18. The medium of claim 16 wherein the derived event is associated with an event time, and wherein the derived event occurs after an expiration of the event time.

19. The medium of claim 16, further comprising one or more instructions for:

deriving the derived event from at least one event associated with one or more entities included in the combination entity, wherein the deriving includes computing at least one of a mean, median, weighted average, or sum, of at least one event time associated with one or more entities included in the combination entity.

20. The medium of claim 16 wherein at least one of the entities included in the combination entity is processed separately from another one of the entities included in the combination entity in response to the occurrence of the derived event.

21. The medium of claim 16 wherein the modeling environment is a graphical modeling environment.

22. The medium of claim 21 wherein the graphical modeling environment is a discrete event system (DES) modeling environment.

23. The medium of claim 22 wherein the instructions further comprising one or more instructions for:

receiving the plurality of entities as input to the entity combiner component; and outputting from the entity combiner component the combination entity.

24. The medium of claim 16 wherein at least one event, associated with an entity contained in the combination entity, is a timeout event.

25. The medium of claim 16 wherein an event, associated with an entity included in the combination entity, is based on:

an inspection of an attribute, a viewing of an attribute, a movement of the entity, associated with the event, in the model, an execution of logic within the entity associated with the event, a receipt of an enabling signal in the model, or a receipt of a disabling signal in the model.

26. The medium of claim 16 wherein an event, associated with an entity included in the combination entity, is based on:

a receipt of the entity associated with the event at an input port in the model, a receipt of the entity associated with the event at an output port in the model, an exiting of the entity associated with the event from an input port in the model, or an exiting of the entity associated with the event from an output port in the model.

27. The medium of claim 16 wherein the at least one an event, associated with an entity included in the combination entity, is based on:

an execution of logic within the entity associated with the event, an execution of logic in a state chart, or an execution of logic within a block diagram.

28. The medium of claim 16 wherein an event, associated with an entity included in the combination entity, is based on information received from an external computing environment that interacts with the model.

29. A computing device implemented method for processing a combination entity holding at least one timeout value in a discrete event system (DES) modeling environment, the method comprising:

receiving a plurality of entities as input to an entity combiner component in a DES model, one or more of the plurality of entities being associated with one or more timeout values;

outputting from the entity combiner component a combination entity formed from the plurality of entities received as input, the combination entity including at least:

two or more entities from the received plurality of entities, and one or more derived timeout values that are derived from one or more timeout values associated with one or more entities included in the combination entity; and processing the combination entity based upon an expiration of at least one derived timeout value included in the combination entity.

30. The method of claim 29 further comprising:

selecting one or more timeout values associated with one or more entities included in the combination entity; and deriving the one or more derived timeout values from the selected one or more timeout values.

31. The method of claim 30, wherein a selected timeout value is at least one of a minimum timeout value or maximum timeout value for one or more timeout values associated with one or more entities included in the combination entity.

32. The method of claim 29, further comprising:

deriving one or more derived timeout values from one or more timeout values associated with one or more entities included in the combination entity, the deriving including computing at least one of a mean, median, weighted average, or sum, of at least one event timeout value associated with one or more entities included in the combination entity.

33. The method of claim 29, further comprising:

performing a first action based upon an expiration of a first derived timeout value that is included in the combination entity.

34. The method of claim 33 wherein the combination entity includes a second derived timeout value after the performance of the first action.

35. The method of claim 34, further comprising:

performing a second action based upon an expiration of the second derived timeout value.

36. The method of claim 33, further comprising:
cancelling a second derived timeout value included in the combination entity based upon the expiration of the first derived timeout value included in the combination entity.

37. The method of claim 29, further comprising:
cancelling at least one derived timeout value included in the combination entity based upon an expiration of a first derived timeout value included in the combination entity.

38. The method of claim 29 wherein an action is performed based upon expiration of all of the included derived timeout values included in the combination entity.

39. The method of claim 29 wherein processing the combination entity further comprises:
generating a new event.

40. The method of claim 29 wherein processing the combination entity further comprises:
generating at least two events based upon expiration of at least two derived timeout values included in the combination entity.

41. The method of claim 29 wherein processing the combination entity further comprises:
resetting or canceling a derived timeout value, included in the combination entity, that has not expired.

42. The method of claim 29, further comprising:
receiving the combination entity at a termination component in the DES model prior to the expiration of at least one derived timeout value included in the combination entity; and
performing an action based upon the receipt of the combination entity at the termination component in the DES model.

43. The method of claim 42 wherein the combination entity is received at the termination component prior to the expiration of at least one derived timeout value included in the combination entity.

44. The method of claim 29 wherein processing the combination entity further comprises:
querying a user to select for cancellation at least one other derived timeout value, included in the combination entity, that has not expired.

45. The method of claim 29, wherein at least one derived timeout value, included in the combination entity, is configured to allow its programmatic cancellation when the combination entity is a sub-entity.

46. The method of claim 29, wherein at least one derived timeout value, included in the combination entity, is configured to disallow its programmatic cancellation when the combination entity is a sub-entity.

47. The method of claim 29, further comprising:
removing an entity from the combination entity based upon the expiration of a derived timeout value.

48. A system for processing a combination entity holding at least one timeout value in a discrete event system (DES) modeling environment, the system comprising:
one or more processors configured to implement:
an entity combiner component in a DES model, the entity combiner component receiving as input a plurality of entities, at least one of the plurality of entities being associated with a timeout value,
a combination entity formed by the entity combiner component from the plurality of entities received as input, the combination entity including:
two or more entities in the plurality of entities received as input, and
at least one derived timeout value that is derived from at least one timeout value associated with an entity included in the combination entity, and
a target processing component, the target processing component processing the combination entity based upon an expiration of at least one derived timeout value included in the combination entity.

49. The system of claim 48, wherein the one or more processors are further configured to implement:
a termination component in the DES model, the termination component performing an action based upon a receipt of the combination entity at the termination component prior to the expiration of at least one derived timeout value included in the combination entity.

50. The system of claim 48 wherein the combination entity includes at least two derived timeout values.

51. A physical medium for use with a computing device, the medium holding instructions for processing events in a modeling environment, the instructions comprising one or more instructions for:
receiving a plurality of entities as input to an entity combiner component in a discrete event system (DES) model, one or more of the plurality of entities being associated with one or more timeout values;
outputting from the entity combiner component a combination entity formed from the plurality of entities received as input, the combination entity including:
two or more entities from the received plurality of entities, and
one or more derived timeout values that are derived from one or more timeout values associated with one or more entities included in the combination entity; and
processing the combination entity based upon an expiration of at least one derived timeout value included in the combination entity.

52. The medium of claim 51 further comprising one or more instructions for:
selecting one of the timeout values associated with the one or more entities included in the combination entity.

53. The medium of claim 52 wherein the selected timeout value is at least one of a minimum or maximum timeout value for one or more timeout values associated with the one or more entities included in the combination entity.

54. The medium of claim 51 further comprising one or more instructions for:
computing at least one of a mean, median, weighted average, or sum, of at least one event timeout value associated with one or more entities included in the combination entity.

55. The medium of claim 51 further comprising one or more instructions for:
performing a first action based upon an expiration of a first derived timeout value included in the combination entity.

56. The medium of claim 55 wherein the combination entity includes a second derived timeout value after the performance of the first action.

57. The medium of claim 56 further comprising one or more instructions for:
performing a second action based upon an expiration of the second derived timeout value.

58. The medium of claim 56 further comprising one or more instructions for:

canceling the second derived timeout value, included in the combination entity, based upon the expiration of the first derived timeout value included in the combination entity.

59. The medium of claim 51 further comprising one or more instructions for:
canceling at least one derived timeout value, included in the combination entity, based upon an expiration of at least one other derived timeout value included in the combination entity.

60. The medium of claim 51 wherein an action is performed based upon expiration of all of the derived timeout values included in the combination entity.

61. The medium of claim 51 wherein processing the combination entity further comprises:
generating a new event.

62. The medium of claim 51 wherein processing the combination entity further comprises:
generating at least two events based upon expiration of at least two derived timeout values.

63. The medium of claim 51 wherein processing the combination entity further comprises:
resetting or canceling of another derived timeout value included in the combination entity.

64. The medium of claim 51 further comprising one or more instructions for:
receiving the combination entity at a termination component in the DES model prior to the expiration of the at least one derived timeout value included in the combination entity; and
performing an action based upon the receipt of the combination entity at the termination component in the DES model.

65. The medium of claim 51 wherein the combination entity is received at an entity splitter component in the DES model, the entity splitter component splitting the combination entity into two or more child entities.

66. The medium of claim 51 wherein the processing the combination entity further comprises:
querying a user to select for cancellation at least one other derived timeout value, included in the combination entity, that has not expired.

67. The medium of claim 51 further comprising one or more instructions for:
configuring at least one derived timeout value, included in the combination entity, so as to allow a programmatic cancellation of the at least one timeout value when the combination entity is a sub-entity.

68. The medium of claim 51 further comprising one or more instructions for:
configuring at least one derived timeout value, included in the combination entity, so as to disallow a programmatic cancellation of the at least one timeout value when the combination entity is a sub-entity.

69. The medium of claim 51 further comprising one or more instructions for:
removing an entity from the combination entity based upon the expiration of the at least one derived timeout value included in the combination entity.

70. A method comprising:
creating a combination entity formed from a plurality of entities in a model, the combination entity being created in a first block in the model, the combination entity including at least:
two or more entities from the plurality of entities, and
an event that is associated with one or more entities included in the combination entity; and
transferring the combination entity to a second block in the model.

71. The method of claim 70, wherein the event has occurred, and wherein the second block is a target processing block that processes the entity after the event has occurred.

72. The method of claim 70, wherein the event is a timeout event.

* * * * *